US000001234H

United States Statutory Invention Registration [19]

[11] Reg. Number: H1234

Burgner

[43] Published: Oct. 5, 1993

[54] SOLID PROPELLANT AIR-TURBOROCKET

[75] Inventor: Gary R. Burgner, Ridgecrest, Calif.

[73] Assignee: The United States of America as represented by the Secretary of the Navy, Washington, D.C.

[21] Appl. No.: 736,459

[22] Filed: Feb. 6, 1985

[51] Int. Cl.[5] ..... F02K 5/00

[52] U.S. Cl. ..... 60/246; 60/253; 60/261; 60/270.1

[58] Field of Search ..... 60/246, 261, 270.1, 60/253

[56] References Cited

U.S. PATENT DOCUMENTS 3,110,153 11/1963 House ..... 60/35.3
4,096,803 6/1978 Kesting ..... 102/49.5

*Primary Examiner*—Stephen C. Bentley
*Attorney, Agent, or Firm*—William C. Townsend; W. Thom Skeer

[57] ABSTRACT

The invention discloses an air-turborocket having a single set of compressor blades extending radially from a common rotor. A shroud ring encircles the outer periphery of the compressor blades and holds a plurality of turbine blades on the outer periphery thereof which are driven by hot expanding fuel rich gases obtained from the partial combustion of a solid propellant in a first combustion chamber external to a compressor housing. The hot expanding fuel rich gases drive the turbine blades which drive the compressor blades thereby providing compressed air which is forcibly mixed by a mixer/diffuser with the hot expanding fuel rich gases for further combustion to provide thrust in a second combustion chamber aft to the compressor.

1 Claim, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

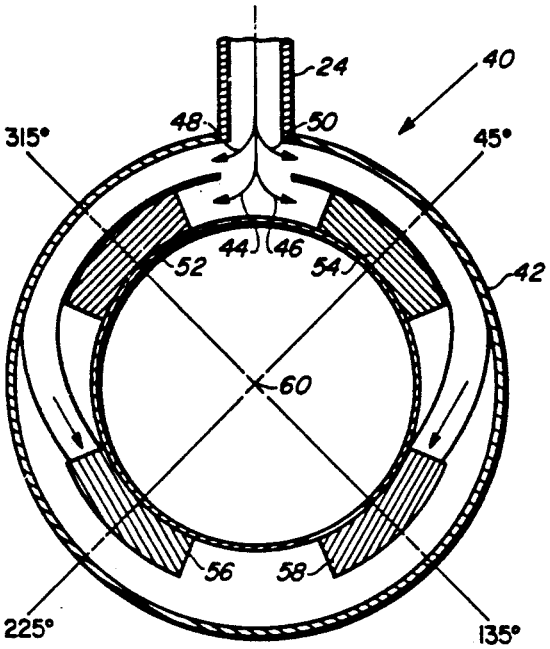
Fig. 3
Fig. 4
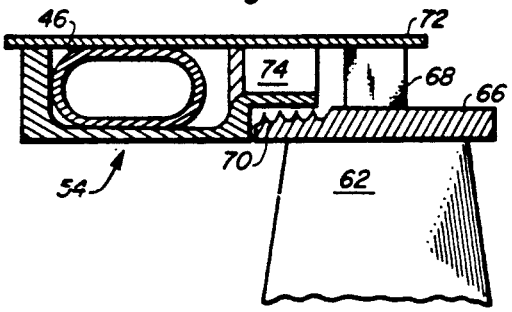
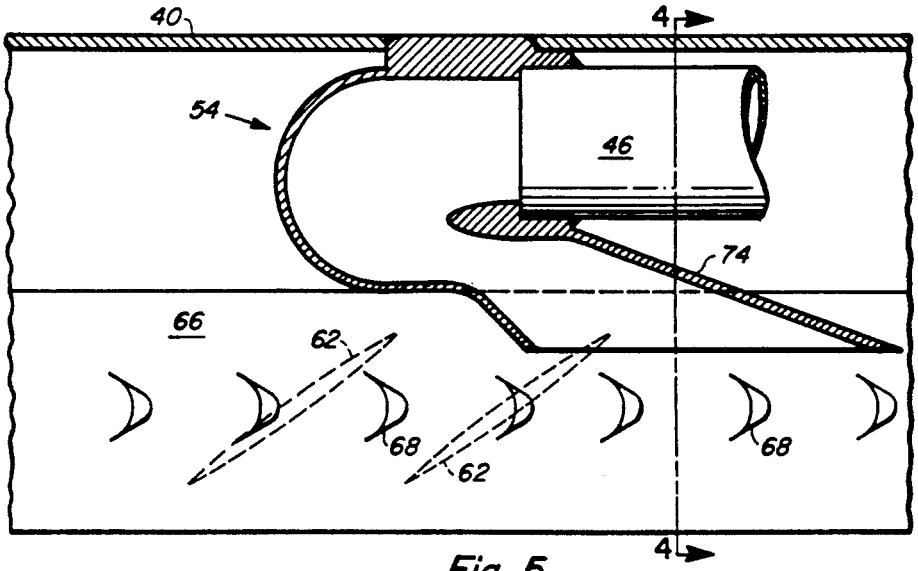
Fig. 5

SOLID PROPELLANT AIR-TURBOROCKET

BACKGROUND OF THE INVENTION

1. Field of the Invention

This invention relates generally to the field of mechanics, aerodynamics, and propulsion systems. More specifically, the invention describes a solid propellant air-turborocket.

2. Description of the Prior Art

An air-turborocket (ATR), also known as air-turboramjet, fan-boosted ramjet, and gas generator turbojet motor, is an airbreathing jet propulsion engine in which ram air compression is supplemented by a mechanical compressor driven by a turbine. The turbine is driven by the exhaust of a gas generator using a fuel-rich liquid or solid propellant. The tubine exhaust gases constitute the fuel, which is burned in the compressed air behind the turbocompressor assembly. Judicious choice of the propellant, compressor pressure ratio, and component efficiencies establishes burner stoichiometry and performance characteristics of the engine.

Past and present ATRs operate well both subsonically and supersonically and do not need supplemental propulsion such as a rocket booster or high speed launch to boost the ATR to a satisfactory operating speed as a ramjet does. The high thrust/weight ratios of ATRs permit ATR propelled missiles to postpone acceleration to supersonic speeds until such speeds are needed for survival or maneuverability close to a target. Thus far, most ATR hardware development has used only liquid propellants; however, solid propellant ATRs offer performance very similar to or superior to engines using high performance liquid monopropellants such as a mixed hydrazine fuel.

Existing solid propellant rockets have been used as boosters for ramjet sustainers. A problem associated therewith is the relatively low specific impulse of the solid propellant in comparison to liquid propellants. The weight of solid propellant required to obtain a given impulse for propelling a missile is appreciably greater than the weight of liquid propellant that would produce the same impulse. If the specific impulse of the solid propellants were greater, missiles using them could have a lower initial weight and perform the same function with reduced hazards. This would be an advantage in the production, cost, and handling of the missiles.

Solid propellants consist primarily of granular oxidizer dispersed in a binder fuel. The weight ratio of oxidizer to binder varies from one composition to another, but it generally is in the ratio of 75 to 85 percent oxidizer with the remaining percentage being fuel. This high ratio of oxidizer is required to insure complete combustion of the fuel. If some of the fuel can be combusted with oxygen from an outside source rather than from oxidizer contained in the propellant, less granular oxidizer would be needed in the propellant. Thrust obtained from the complete combustion of the fuel remains approximately the same regardless of the source of the oxidizer.

An alternative to combusting solid propellant fuel entirely from granular oxidizer dispersed in the propellant is to use oxygen from surrounding air as a partial source of oxidizer. This is achieved in a ducted rocket ramjet by placing a shroud around the nozzle of a fuel rich solid propellant motor. Air is admitted at the forward end of the shroud and mixes with fuel-rich combustion products from the motor to produce additional burning, gas expansion, and thrust when discharged from the aft end of the shroud. The heretofore proposed ducted rocket ramjets employ booster charges or motors. The booster, which is a conventional solid propellant rocket, overcomes the added drag and weight of the shroud, accelerates the missile to ramjet velocities, and the booster, or certain parts of it are then separated.

The liquid or solid propellant ATRs, similar in concept to this invention, utilize a turbine-driven air compressor in conjunction with afterburners to improve specific impulse. The well known trade offs between liquid and solid propulsion systems are applicable here. Solid propellants offer substantial advantages in lower manufacturing cost, safety, simplicity, storability, logistics, and reliability. The use of compressed atmospheric air to augment the thrust of solid propellant rockets is especially attractive for relatively large diameter, long range missiles delivering heavy payloads.

Existing solid propellant ATRs, however, have been designed with less efficiency than is desirable. Hot expanding gases from the solid propellant which drive the turbine for the air compressor in existing solid propellant ATRs provide a poor match between turbine and compressor blade speeds. In addition, the rotor disk and accompanying bearing surfaces from which the compressor blades radiate are exposed to the hot expanding fuel rich gases of existing solid propellant ATRs, a very undesirable situation. Further, in addition to the above, there remains a continuing need for forcibly mixing the hot expanding fuel rich gases with the compressed airstream in the thrust combustion chamber to minimize the length and weight of the chamber. In consideration of the foregoing prior art limitations to present day needs, the invention disclosed herein was conceived.

SUMMARY OF THE INVENTION

The invention is a solid propellant fuel air-turborocket. The propellant contains less granular oxidizer than does a normal solid propellant. The propellant fuel combusts in two stages, the first stage in a first chamber and the second stage in a second chamber. Combustion in the first chamber results from the fuel being partially oxidized by the granular oxidizer dispersed in the propellant fuel. This partial combustion produces hot, fuel rich gases which pass into the second chamber through turbine blades fixed to a shroud ring circling the outer periphery of air compressor blades which radially extend from a central rotor disk. The passage of the gases through the turbine blades moves the turbine blades at a higher speed than that of the compressor blades by virtue of the turbine blades' greater radius. The turbine drives the compressor which compresses atmospheric air and which is fed into the second chamber. Oxygen in the compressed air reacts in the second chamber with the hot expanding fuel rich gases from the initial combustion in the first chamber, thereby generating more heat and gas expansion. The hot gases produced by this second combustion pass through a nozzle of the second chamber and into the atmosphere thus imparting thrust to the missile.

OBJECTS OF THE INVENTION

It is a primary object of the invention to provide a propulsion device which operates primarily within the atmosphere and is suitable for effectively propelling aircraft, projectiles, missiles, and target vehicles at subsonic and/or supersonic speeds.

It is a further object of the invention to significantly improve the performance and safety of existing ATRs by using solid propellants as opposed to liquid propellants.

Another object of the invention is to provide for an ATR engine using solid propellants similar to those developed for ducted rockets to deliver specific impulse (Isp) values comparable to those offered by high performance storable liquid monopropellants. A further object of the invention is to provide a solid propellant ATR that offers reduced engine complexity and cost, higher propellant density, and elimination of spill or leakage hazards compared with liquid propellant ATRs.

Yet another object of the invention is to provide a better ratio of turbine blade velocities to compressor blade velocities to yield a more mechanically efficient turbine air compressor.

Yet a further object of the invention is to provide a solid propellant ATR which provides a means for forcibly mixing fuel rich gases with compressed airstreams in the second combustion chamber to minimize length and weight requirements of the second chamber.

Another object of the invention is to eliminate the need in existing designs for jettisoning the turbine air compressor means to convert the engine from an air-turborocket to a ramjet thereby preventing potential harm to personnel in other aircraft or on the surface from falling debris.

These and other objects, features, and advantages of the present invention will become more readily apparent and obvious in light of the following drawings and description of a preferred embodiment in view of the attached claims.

BRIEF DESCRIPTION OF THE DRAWINGS

FIG. 3 is a frontal view of a turbine gas directing manifold.

FIG. 4 is an enlarged view of the gas inlet housing and turbine blade orientation of FIG. 2.

FIG. 5 is a top and perpendicular view of the gas inlet housing and turbine shroud ring.

DESCRIPTION OF THE PREFERRED EMBODIMENT

Figure 1:
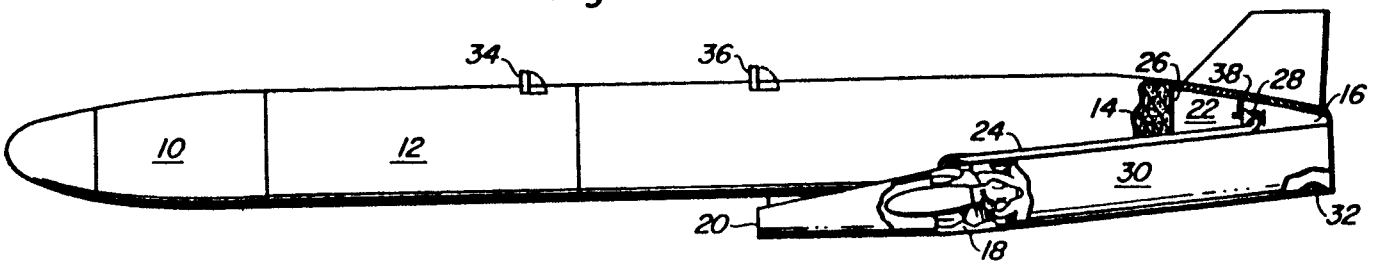
FIG. 1 shows a typical guided missile in which a solid propellant ATR may be used.

A typical environment of the solid propellant air-turborocket disclosed herein is illustrated in FIG. 1. A typical guided missile having an avionics compartment 10, a warhead compartment 12, a solid propellant fuel compartment 14, and a gas generator control valve and control surface actuator compartment 16 is propelled by an ATR 18 positioned aft to an air inlet 20 of an ATR housing 21. A first combustion compartment 22 contains a gas generator and ignition means for generation of a hot expanding gas by partial combustion of a fuel rich solid propellant in compartment 14. The solid propellant gas generator is of a configuration well known in the art and substantially similar to those used and designed for use in ducted rocket art. Briefly described, it is an internally insulated rocket motor type pressure vessel into which the propellant grain may be cast or inserted as a cartridge. The propellant is ignited pyrotechnically on a free surface, from which surface the propellant gas is liberated by decomposition or oxidation reduction reaction. In propellants which yield gases by decomposition, the gases tend to consist largely of species which could be burned as fuel in air or oxygen; e.g. carbon monoxide (CO), hydrogen ($H_2$), ammonia ($NH_3$), and various hydrocarbons. In propellants consisting of an unreacted mixture of oxidizers and fuels, there is by design an insufficient amount of oxidizer to completely consume and react with all the fuel; however, there is enough oxidizer to vaporize and/or suspend solid particles of fuel in a mixture of vapors and gases, which facilitates their transport out of the pressure vessel through a gas conduit 24. A burning surface 26 regresses into the solid propellant grain until the propellant is consumed. The rate of regression is dependent primarily on the pressure to which the burning surface is subjected, this pressure being controlled by the characteristics of the propellant, its temperature before reacting, and the resistance to escaping from the vessel encountered by the gases produced, which can be regulated by a gas control valve 28. Typically, the propellant grain burns from one end of the vessel to the other like a cigarette, or from the inside of a longitudinally oriented hole in the propellant grain radially outward. A great variety of geometric grain shapes can be designed, with the intent of producing a specified schedule of gas production rate as a function of time from ignition. Additional variations in gas production rate can be induced by increasing or decreasing the ease with which the evolving gases are able to escape the pressure vessel. Again, such is accomplished by gas control valve or valves 28 which vary the effective size of gas conduit 24 opening or openings. Restricting openings 24 causes an increase in pressure within the vessel, which increases the rate at which the surface reaction regresses into the unburned propellant, increasing the flow of gas out of the vessel. Hot fuel rich expanding gases pass through gas conduit 24 through ATR 18 into a second combustion chamber 30 for additional combustion thereof to provide thrust upon passing through an exit nozzle 32. The guided missile illustrated in FIG. 1 can conveniently be air launched by means of retractible launch lugs 34 and 36. An igniter 38 is customarily placed adjacent to gas control valve/throttle valve 28.

Figure 2:
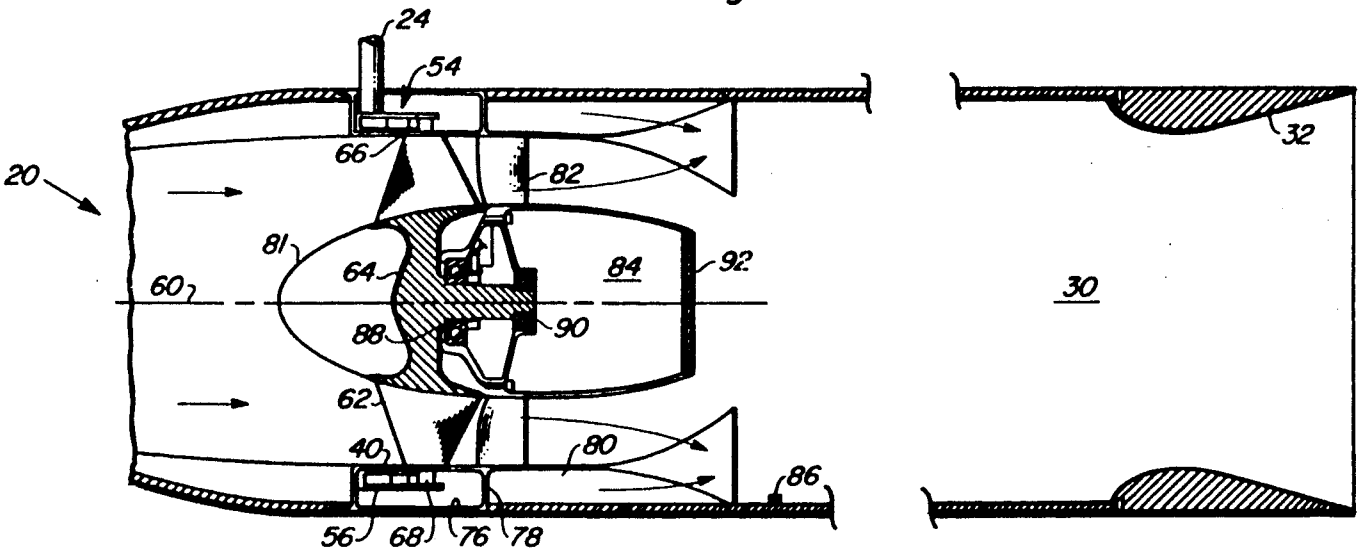
FIG. 2 is a cutaway and schematic representation of the air-turborocket of this invention.

Referring now to FIG. 2, a cross-section of ATR 18 of FIG. 1 is provided. Hot expanding gases from gas generator 22 of FIG. 1 enter into a gas inlet manifold 40 via gas conduit 24. Gas inlet manifold 40 is more clearly delineated in FIG. 3 and comprises a circular tubular ring 42 having four internal conduits 44, 46, 48, and 50, leading to four turbine nozzle assembly compartments 52, 54, 56, and 58, respectively, which in the preferred embodiment are positioned at angles of 45°, 135°, 225° and 315° from the main conduit entry position.

Turbine nozzle assembly compartment 54 is illustrated in a side view in FIG. 2. A blown up diagram of turbine nozzle assembly compartment 54 in FIG. 2 is provided in FIG. 4, and a blown up top view of turbine nozzle assembly compartment 54 is provided in FIG. 5. Referring now to FIGS. 2, 4 and 5, the invention conceives a single-stage axial-flow air compressor having thirteen or other appropriate number of compressor blades 62 radially extending from a common central rotor 64 with a shroud ring 66 circumscribing the outer periphery of compressor blades 62. Again, in the preferred embodiment, one hundred and four turbine blades are positioned on the opposite surface of shroud ring 66 extending into turbine nozzle assembly compartment 54. A labyrinth seal 70 confines the hot expanding fuel rich gases in turbine nozzle assembly compartment 54. An assembly housing roof 72 in FIG. 4 and angled wall 74 in FIGS. 4 and 5 direct the hot expanding fuel rich gases from turbine nozzle assembly compartment 54 against turbine blades 68 into a gas collecting compartment 76 illustrated in FIG. 2. The hot expanding fuel rich gases then pass through a porous wall 78 of gas collecting compartment turbine exhaust plennum 76 into a fuel-air mixer/diffuser device 80 illustrated in FIG. 2. Fuel-air mixer/diffuser device 80 is difficult to illustrate; however, it is a sheet metal device that is well known in the art.

The expanding gases impinging on turbine blades 68 cause compressor blades 62 to compress atmospheric air entering inlet 20 passing over a fairing 81, through compressor blades 62 and through a series of approximately twenty-three stator vanes extending radially outward from and supporting a compressor housing 84 within ATR housing 21. The compressed air is then forcibly mixed with the hot expanding fuel rich gases in fuel-air mixer/diffuser 80, passes into second combustion chamber 30, and is ignited by a pyrotechnic igniter 86 to provide further combustion of the mixture which then passes through nozzle 32 to create thrust.

Mode of Operation

The air compressor, rotor 64 and blades 62, which may be of varying types and performance characteristics different from that shown without altering the basic operation of the invention, being driven by turbine blades 68, compresses the air, raising its stagnation pressure and temperature. The compressed air, upon exiting the compressor rotor blading 62 and stator vanes 82, if any, enters diffuser/mixer assembly 80 which mixes the compressed air with the hot expanding fuel rich gases arriving in the mixer from the turbine exhaust plennum 76. The fuel rich gases and compressed air combust in second combustion chamber 30 upon ignition by suitable means not critical to the present invention. The combustion process is suitably stabilized by well known means which are not critical to the present invention. Likewise, the main walls of second combustion chamber 30 are prevented from reaching damaging temperatures by well developed means which are not critical to the present invention. Some thermal protection approaches may involve diversion of a small part of the compressor discharge air for cooling purposes, thereby removing that part of the air from the combustion process; however, this is a conventional practice and does not alter the basic operation of the present invention. At some location downstream of second combustion chamber 30, at which distance the combustion and heat release is substantially or satisfactorily complete, exhaust nozzle 32 is positioned of more or less conventional aerodynamic and structural design and material, whose purpose is to accelerate the combustor discharge gases to an optimally high velocity, usually supersonic relative to the stationary engine parts. Thrust is produced in accordance with the laws of physics applicable to all airbreathing propulsion devices; i.e., the momentum of the fluids leaving the engine to the rear is greater than the momentum of the flow that is entering the engine in general according to the following formula:

$$T = M_A V_{EX}(1 + f/a) - V_\infty + A_{EX}(P_{EX} - P_A)$$

where T is thrust, $M_A$ is mass rate of flow of air, $V_{EX}$ is exhaust velocity, f/a is fuel to air mass ratio, $V_\infty$ is velocity of the aircraft/missile, $A_{EX}$ is cross section area of exhaust exit, $P_A$ is ambient pressure, and $P_{EX}$ is nozzle exhaust static pressure.

As with all airbreathing propulsion engines, the thrust and fuel consumption characteristics depend on the flight condition, air temperature and pressure, the efficiencies with which thermodynamic changes in state are accomplished by the machinery, the degree to which the air is compressed in the compressor, the characteristics of fuel or propellant, and how much fuel is mixed or burned in the air.

Although the foregoing description has related specifically to turbine nozzle assembly compartment 52, it should be obvious from the symmetrical nature of the turbine/compressor device that turbine nozzle assembly compartments 52, 54, 56 and 58 all function in identically the same manner. It should also be noted that in the invention as described and claimed, conventional thrust bearings 88 and alignment bearings 90 are enclosed and protected by a heat shield 92 from the hot expanding fuel rich gases passing thereby.

It should be understood that the terms and expressions which have been employed in the foregoing specification are used therein as terms of description and not of limitation, and there is no intention in the use of such terms and expressions of excluding equivalents of the feature shown and described or portions thereof, it being recognized that the scope of the invention is defined and limited only by the claims which follow.

What is claimed is:

1. A solid propellant propulsion engine for propelling an aircraft/missile through the atmosphere, comprising:

a tubular housing having an air inlet and an exhaust nozzle outlet;

pressure vessel means, external to said housing, for containing and for partial combustion of a solid propellant loaded in said pressure vessel means to create a fluid fuel supply in the form of a hot, combustible mixture of expanding gases;

a turbine inlet manifold circumferentially and internally mounted between said inlet and said outlet of said housing;

conducting means coupling said pressure vessel means to said turbine inlet manifold for passing said expanding gases in said pressure vessel means to said turbine inlet manifold;

compressor means, axially mounted in said housing between said inlet and said outlet, said compressor means including a central shaft having a plurality of compressor blades extending radially outward in a single plane therefrom, for compressing air entering said housing inlet;

turbine means for driving said compressor means, said turbine means including a shroud ring having an inner and an outer surface, wherein said inner surface is attached to distal ends of said compressor blades, said turbine means further including turbine blades attached to and extending radially outward from said outer surface of said shroud ring into said turbine inlet manifold to be driven by said expanding gases;

a turbine exhaust plennum for collecting said expanding gases after said gases have passed from said pressure vessel means, through said conducting means, through said turbine inlet manifold, and through said turbine means, said turbine exhaust plennum terminating in a plurality of injector ports through which said collected gases are directed;

a plurality of compressor stator vanes, axially fixed between said compressor means shaft and said turbine exhaust plennum, for slowing down and redirecting said compressed air;

diffuser means, mounted in said housing between said turbine means and said exhaust nozzle outlet, for forcibly mixing and diffusing said compressed air with said expanding gases; and combustor means, mounted in said housing between said diffuser means and said exhaust nozzle outlet, for containing and further combusting said mixture of compressed air and expanding gases.

* * * * *